US012117372B2

(12) United States Patent
An et al.

(10) Patent No.: US 12,117,372 B2
(45) Date of Patent: Oct. 15, 2024

(54) CONVENIENT AND SMALL NEAR-GROUND ATMOSPHERIC-BOUNDARY-LAYER WIND TUNNEL AND ITS APPLICATION IN HUMAN EXPOSURE RISK ASSESSMENT

(71) Applicant: Guandgdong University of Technology, Guangdong (CN)

(72) Inventors: Taicheng An, Guangzhou (CN); Ting Zhang, Guangzhou (CN); Guiying Li, Guangzhou (CN); Zuming Wang, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 17/613,294

(22) PCT Filed: May 19, 2020

(86) PCT No.: PCT/CN2020/091054
§ 371 (c)(1),
(2) Date: Nov. 22, 2021

(87) PCT Pub. No.: WO2020/233569
PCT Pub. Date: Nov. 26, 2020

(65) Prior Publication Data
US 2024/0288334 A1    Aug. 29, 2024

(30) Foreign Application Priority Data
May 20, 2019  (CN) .......................... 201910419507.3

(51) Int. Cl.
*G01M 9/02*    (2006.01)
(52) U.S. Cl.
CPC .................... *G01M 9/02* (2013.01)
(58) Field of Classification Search
None
See application file for complete search history.

(56) References Cited

FOREIGN PATENT DOCUMENTS

| CN | 102323037 A | 1/2012 |
| CN | 205867961 U | 1/2017 |

(Continued)

OTHER PUBLICATIONS

International Search Report Dated Jul. 30, 2020, Application No. PCT/CN2020/091054.

*Primary Examiner* — Brandi N Hopkins
*Assistant Examiner* — Nigel H Plumb
(74) *Attorney, Agent, or Firm* — The Dobrusin Law Firm, PC

(57) ABSTRACT

The present invention discloses a convenient and small near-ground atmospheric-boundary-layer wind tunnel and its application in the human exposure risk assessment. This near-ground atmospheric-boundary-layer wind tunnel comprises a wind tunnel body and a reflux stabilizer; the wind tunnel body comprises a natural wind injection device and a simulation test device, with the natural wind injection device, the simulation test device and the reflux stabilizer connected in sequence; the natural wind injection device comprises a pipe fan, a swirl mixing pipe, a diffusion homogenizer, and a cyclone distribution pipe connected in sequence; the diffusion homogenizer is provided inside at the center with an inner member for preventing flow separation; and a static mixing spiral rod is welded on the inner wall surface of the swirl mixing pipe. The measurement of the atmospheric-pollutant environmental migration and transformation behavior through this wind tunnel reduces the floor area of the wind tunnel and saves the investment. The wind tunnel can allow research of the environmental migration and transformation process of near-ground atmospheric pollutants in a local area and assessment of the impact of the near-ground atmospheric pollutants on the population health.

10 Claims, 3 Drawing Sheets

(56) References Cited

FOREIGN PATENT DOCUMENTS

| | | | |
|---|---|---|---|
| CN | 107084829 | * | 8/2017 |
| CN | 107084829 A | | 8/2017 |
| CN | 206710054 U | | 12/2017 |
| CN | 107860547 A | | 3/2018 |
| CN | 109632246 A | | 4/2019 |
| CN | 110333043 | * | 5/2019 |
| CN | 110186639 A | * | 8/2019 |
| CN | 110333043 A | | 10/2019 |
| JP | 2019035718 A | | 3/2019 |
| RU | 158390 U1 | | 12/2015 |

* cited by examiner

CONVENIENT AND SMALL NEAR-GROUND ATMOSPHERIC-BOUNDARY-LAYER WIND TUNNEL AND ITS APPLICATION IN HUMAN EXPOSURE RISK ASSESSMENT

FIELD OF THE INVENTION

The present invention belongs to the technical field of wind tunnel device design and construction, and diffusion and exposure risk assessment methods; more specifically, the present invention relates to a convenient and small near-ground atmospheric-boundary-layer wind tunnel and its application in the human exposure risk assessment.

BACKGROUND OF THE INVENTION

The mainstream wind tunnel at present is large-scale. The design and construction of large-scale wind tunnels are mostly for aerodynamic tests, which are complicated; besides, the wind tunnel is generally a straight cylinder in shape provided inside with a honeycomb, occupying a large area and costing a lot.

The flow field in the near-ground atmospheric-boundary-layer wind tunnel will affect the migration and transformation characteristics of atmospheric pollutants. It is urgent to adopt reliable experimental methods to assess the impact of atmospheric-pollutant environmental migration and transformation on human health, especially under the influence of complex multiple factors (such as topography, source emissions, weather and climate). Therefore, it is of great significance to design a small portable wind tunnel that can simulate natural wind fields, and can be used for early warning of emergent environmental pollutant events and assessment of atmospheric-pollutant exposure risks.

CONTENTS OF THE INVENTION

In order to solve the above-mentioned shortcomings and disadvantages in the prior art, the primary object of the present invention is to provide a convenient and small near-ground atmospheric-boundary-layer wind tunnel. This wind tunnel can allow research of the environmental migration and transformation process of near-ground atmospheric pollutants in a local area and assessment of the impact of the near-ground atmospheric pollutants on the population health.

The other object of the present invention is to provide the application of the above convenient and small near-ground atmospheric-boundary-layer wind tunnel.

The objects of the present invention are achieved through the following technical solution:

A convenient and small near-ground atmospheric-boundary-layer wind tunnel is provided, comprising a wind tunnel body and a reflux stabilizer; the wind tunnel body comprises a natural wind injection device and a simulation test device, with the natural wind injection device, the simulation test device and the reflux stabilizer connected in sequence; the natural wind injection device comprises a pipe fan, a swirl mixing pipe, a diffusion homogenizer, and a cyclone distribution pipe connected in sequence; the diffusion homogenizer is provided inside at the center with an inner member for preventing flow separation; and a static mixing spiral rod is welded on the inner wall surface of the swirl mixing pipe.

Further, the natural wind injection device is provided with a tangential air inlet and an axial vent, and the swirl mixing pipe is provided with an outer pipe and an inner pipe, with the outer pipe connected to the pipe fan through the tangential air inlet; and the axial vent is provided with a static blade, a vortex baffle, and a porous medium filling member.

Further, the inner member for preventing flow separation is made of temperature-resistant and corrosion-resistant material (silicon carbide, graphene or stainless steel), and has the shape of a ring, a spiral or a fan blade; and the static mixing spiral rod comprises a bundle of porous corrugated plates or a group of spiral rods.

Further, the reflux stabilizer comprises an elbow pipe, an air induction pipe, a reducer and a reflux pipe that are connected; the elbow pipe comprises a first elbow pipe, a second elbow pipe and a third elbow pipe; the first elbow pipe is connected at both ends to the simulation test device and the air induction pipe, respectively; the air induction pipe is connected to the second elbow pipe, which is connected to the reflux pipe; the reducer is connected at both ends to the reflux pipe and the third elbow pipe, respectively; and the third elbow pipe is connected to the pipe fan.

Further, the elbow pipe and the reflux pipe have the shape of a square or a ring, and a cross-sectional area of 0.01-1 $m^2$; and the reducer and the reflux pipe have a pipe length of 0.1-10 m.

Further, the simulation test device is communicated at both sides and/or the upper portion with the atmosphere through the exhaust box, whose wall surface is trumpet-shaped and has a porous structure.

Further, the simulation test device is provided inside with a terrain model, which is provided with a sampling hole, a sample inlet, or a groove with a culture medium; the sampling hole and the sample inlet have the shape of a circle, an ellipse, a rectangle or a polygon, and a cross-sectional area of 0.001-1 $m^2$.

Further, the terrain model is provided on the surface with more than one of waterways, biomarkers, and materials with the temperature control function.

Preferably, the biomarkers are *Taxiphyllum taxirameum*, *Sphagnum*, *Pleurozium schreberi*, *Barbula subcontorta* Broth, *Funaria hygrometrica*, *Hypnum plumaeforme* or hoppers; the materials with the temperature control function are one or more of polyurethane, polyethylene, polystyrene, foam glass, magnesium oxide, nanosilica, and aluminum, with the thermal conductivity λ of 0.001-250 W/(m·K).

The convenient and small near-ground atmospheric-boundary-layer wind tunnel is applied to assessment of the near-ground atmospheric-pollutant diffusion and the population exposure risks in a local area, or assessment of the impact of the environmental migration and transformation process on population health.

The present invention has the following beneficial effects compared with the prior art:
 1. The present invention, designing the traditional wind tunnel into a reflux wind tunnel that can simulate the reflux of the natural wind pollutant diffusion state, is not only suitable for the measurement of the near-ground atmospheric-boundary-layer aerodynamics, but also suitable for the measurement of the atmospheric-pollutant environmental migration and transformation behavior, reducing the floor area of the wind tunnel and saving the investment.
 2. Through the design of double air inlets, the present invention improves the single-factor test function of the traditional wind tunnel, and realizes the spatiotemporal atmospheric-pollutant control and observation functions of the "quasi-natural wind" wind tunnel.
 3. The wind tunnel of the present invention can simulate the continuous and intermittent emission of near-ground atmospheric-boundary-layer pollution sources, natural wind such as monsoon, changes in weather and climate such as inversion temperature and humidity, atmospheric flow under the influence of human activities, and concentration fields; based on the observation of the visual model of the atmospheric-pollutant environmental migration and transformation process, the wind tunnel of the present invention can be used in the assessment of population exposure risks, especially in the assessment of the impact of the environmental migration and transformation process on the population health; thus, the wind tunnel of the present invention can realize the qualitative and quantitative measurement of the hazards in atmospheric-pollutant diffusion regions and the exposure assessment, such as population health risk assessment and pollution event emergency warning assessment, being simple in structure, economically feasible and worth promoting.

4. The wind tunnel of the present invention, as a sealed circulatory wind tunnel, saves the building space, and is suitable for testing the pseudo-natural wind migration and transformation behavior of volatile and semi-volatile atmospheric VOC pollutants; it is a high-resolution, high-precision, economical and reliable portable environmental wind tunnel device that can be used for early warning of emergent atmospheric pollution events, and can also be used for health risk assessment of people exposed to atmospheric pollution events.

5. The convenient and small near-ground atmospheric-boundary-layer wind tunnel of the present invention can be used to construct a rotary wind tunnel for natural wind (such as adjusting wind direction, wind speed, wind pressure and wind shape of cyclone, local circulation, and the like), and to conduct the atmospheric-pollution exposure assessment research of local regions under different terrain conditions in the test device.

DETAILED DESCRIPTION OF THE EMBODIMENTS

The present invention will be further described below in conjunction with specific examples; however, these examples should not be construed as limiting the present invention.

Example 1

Figure 1:
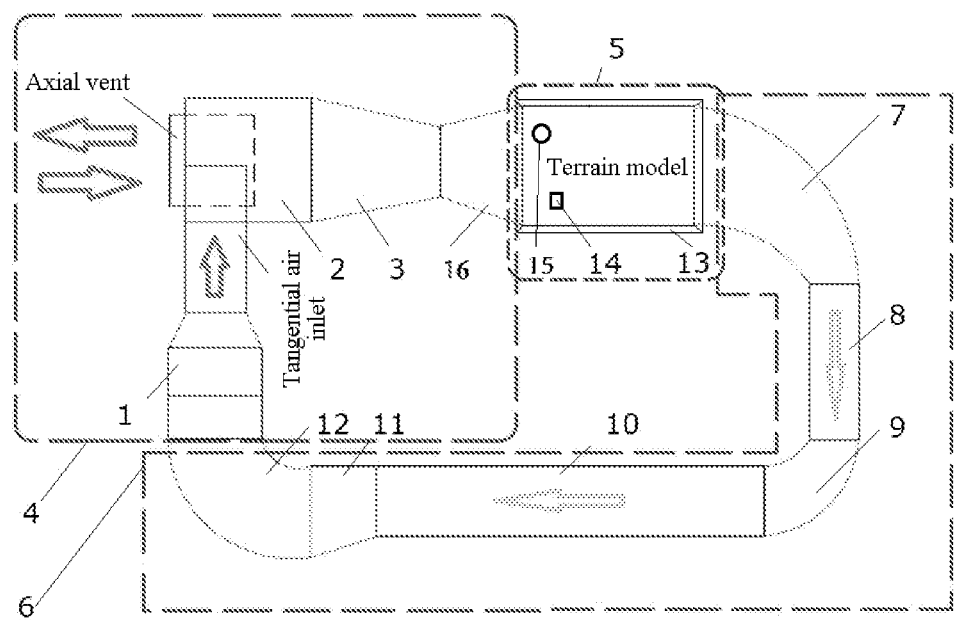
FIG. 1 is a top view of the structure of the convenient and small near-ground atmospheric-boundary-layer wind tunnel of the present invention.

FIG. 1 is a top view of the structure of the convenient and small near-ground atmospheric-boundary-layer wind tunnel of the present invention. In FIG. 1: 1. pipe fan; 2. Swirl mixing pipe; 3. diffusion homogenizer; 4. natural wind injection device; 5. simulation test device; 6. reflux stabilizer; 7. first elbow pipe; 8. air induction pipe; 9. second elbow pipe; 10. reflux pipe; 11. reducer; 12. third elbow pipe; 13. exhaust box; 14. sample inlet; 15. sampling hole; 16. cyclone distribution pipe; an arrow shows the direction of airflow.

The near-ground atmospheric-boundary-layer wind tunnel of the present invention comprises a wind tunnel body and a reflux stabilizer 6; the wind tunnel body comprises a natural wind injection device 4 and a simulation test device 5, with the natural wind injection device 4, the simulation test device 5 and the reflux stabilizer 6 connected in sequence; the natural wind injection device 4 comprises a pipe fan 1, a swirl mixing pipe 2, a diffusion homogenizer 3, and a cyclone distribution pipe 16 connected in sequence; the diffusion homogenizer 3 is provided inside at the center with an inner member 17 for preventing flow separation; and a static mixing spiral rod 18 is welded on the inner wall surface of the swirl mixing pipe 2.

The natural wind injection device 4 can achieve a whirling wind through the swirl mixing pipe 2 and the diffusion homogenizer 3. The arrangement of a tangential air inlet, an axial vent and the swirl mixing pipe 2 can not only meet the needs of the air supply and exhaust experiments of the equipment, but also facilitate the design of natural wind simulation conditions. The axial vent can be used as an air inlet or an air outlet, so that the natural wind flows through the tangential air inlet and the axial vent to get mixed in the swirl mixing pipe 2. When the terrain model in the simulation test device 5 provides a test space for testing the airflow in the near-ground atmospheric boundary layer under the surface conditions of different regions, with the opening degree of the exhaust box 13 adjusted, the wind tunnel can realize the function of assessing the population exposure risks of atmospheric pollutants based on different ground surface characteristics under different conditions (such as temperature, humidity, concentration, and composition). The reflux stabilizer 6 can make the airflow revolve, so as to realize the high-resolution measurement of an atmospheric flow field (such as a speed field, a concentration field, a shear stress field, a turbulent kinetic energy field, etc.) in different time and space in the experimental device with the terrain model.

Figure 2:
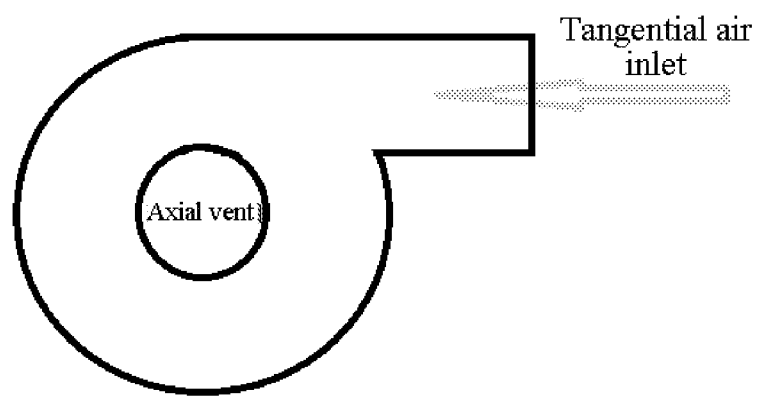
FIG. 2 is a side view of the structure of the near-ground atmospheric-boundary-layer wind tunnel.

FIG. 2 is a side view of the structure of the near-ground atmospheric-boundary-layer wind tunnel. The swirl mixing pipe 2 is divided into an inner pipe and an outer pipe, and the natural wind injection device 4 is provided with an axial vent (inner pipe) as well as a tangential air inlet (outer pipe) connected to the pipe fan 1, with the outer pipe connected to the pipe fan 1 through the tangential air inlet; and the axial vent is provided with a static blade, a vortex baffle, and a porous medium filling member.

The reflux stabilizer 6 comprises an elbow pipe, an air induction pipe 8, a reducer 11 and a reflux pipe 10 that are connected; the elbow pipe comprises a first elbow pipe 7, a second elbow pipe 9 and a third elbow pipe 12; the first elbow pipe 7 is connected at both ends to the simulation test device 5 and the air induction pipe 8, respectively; the air induction pipe 8 is connected to the second elbow pipe 9, which is connected to the reflux pipe 10; the reducer 11 is connected at both ends to the reflux pipe 10 and the third elbow pipe 12, respectively; and the third elbow pipe 12 is connected to the pipe fan 1.

The inner member 17 for preventing flow separation is made of temperature-resistant and corrosion-resistant material (silicon carbide, graphene or stainless steel), and has the shape of a ring, a spiral or a fan blade; and the static mixing spiral rod 18 comprises a bundle of porous corrugated plates or a group of spiral rods.

The elbow pipe and the reflux pipe 10 have the shape of a square or a ring, and a cross-sectional area of 0.01-1 $m^2$; and the reducer 11 and the reflux pipe 10 have a pipe length of 0.1-10 m.

The simulation test device 5 is communicated at both sides and/or the upper portion with the atmosphere through the exhaust box 13, whose wall surface is trumpet-shaped and has a porous structure.

The simulation test device 5 is provided inside with a terrain model, which is provided with a sampling hole 15, a sample inlet 14, or a groove with a culture medium; the sampling hole 15 and the sample inlet 14 have the shape of a circle, an ellipse, a rectangle or a polygon, and a cross-sectional area of 0.001-1 $m^2$.

The terrain model is provided on the surface with more than one of waterways, biomarkers, and materials with the temperature control function.

In order to simulate the real environment, the biomarkers are selected from *Taxiphyllum taxirameum, Sphagnum, Pleurozium schreberi, Barbula subcontorta* Broth, *Funaria hygrometrica, Hypnum plumaeforme* or hoppers; the materials with the temperature control function are one or more of polyurethane, polyethylene, polystyrene, foam glass, magnesium oxide, nanosilica, and aluminum, with the thermal conductivity $\lambda$ of 0.001-250 W/(m·K).

Example 2

Figure 3:
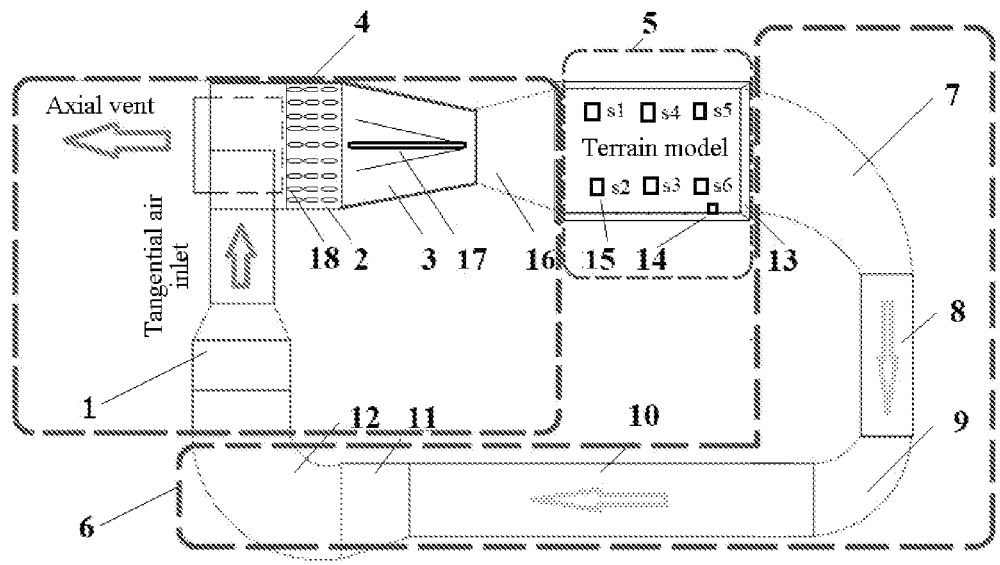
FIG. 3 is a top view of the structure of the near-ground atmospheric-boundary-layer wind tunnel in Example 2.

A convenient and small near-ground atmospheric-boundary-layer wind tunnel is shown in FIG. 3. This wind tunnel is the same in structure as the wind tunnel shown in FIG. 1, except that an inner member 17 for preventing flow separation is provided in the diffusion homogenizer 3; the inner member 17, in the shape of an umbrella bone, is placed at the inner center of the diffusion homogenizer 3, and has the function of breaking the vortex and equalizing the flow, so as to ensure that the inlet air conditions of the simulation test device are consistent; multiple sets of static mixing spiral rods 18, in the shape of spiral ribbons and bundled into bundles, are welded on the inner wall surface of the swirl mixing pipe 2, so as to make the concentration, speed, and flow pattern of the pseudo natural wind uniform and stable. According to the wind speed simulation results of the inlet pipe in the test section of the wind tunnel, the natural wind field of the wind tunnel is measured at a wind speed of 1.5 m/s after the wind speed stability assessment; the data acquisition points are distributed at points s1, s2 and s3 of the sampling hole 15, and the relative humidity during experiment and test is set to 90%, 60%, 45%, 30% and 15%, respectively. A sample inlet 14, rectangular in shape with a cross-sectional area of 0.05 $m^2$, is located at the top of a mountain of the terrain model in the wind tunnel. The intake speed at the sample inlet 14 is 3.3 m/s, and the inlet sample is a toluene-air mixed gas of 100 μg/$m^3$. The wind speed in the wind tunnel is uniform and stable, and the fluctuation rate of the inlet wind speed in the test region is less than 5%, so that the quality of the flow field can meet the requirements of the test. Compared with the domestic standard requirements for wind tunnels, the dynamic pressure field coefficient, airflow deflection angle, dynamic pressure stability, turbulence degree and axial static pressure gradient of the wind tunnel of the present invention are all less than the standard requirements.

Figure 4:
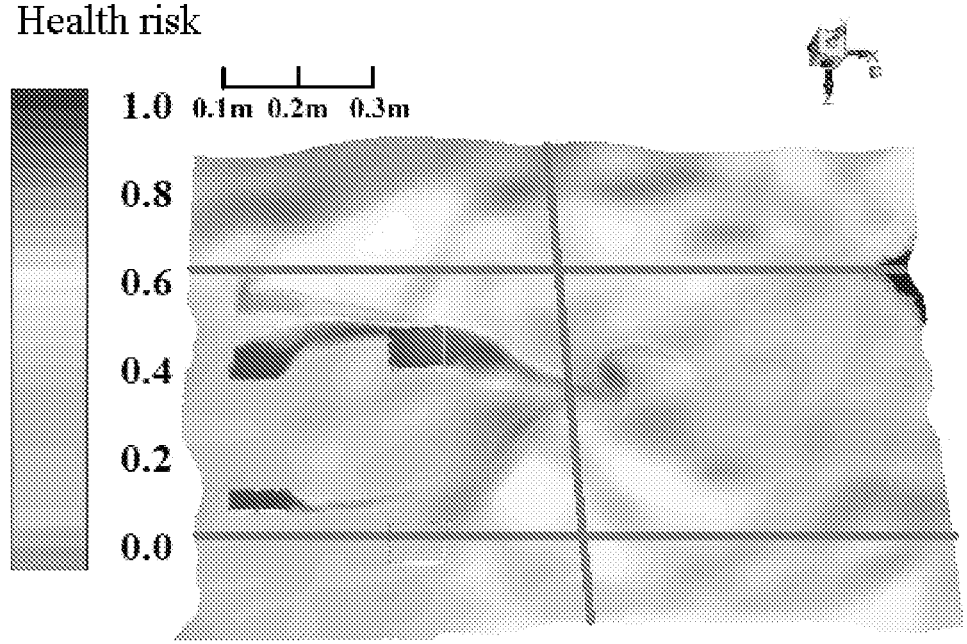
FIG. 4 schematically shows the assessment of human health risks of the atmospheric pollutants in Example 2.

The computational fluid dynamics (CFD) method is used to simulate the flow field in the model test region of the wind tunnel through the numerical modeling of the wind tunnel, so that the airflow at the inlet side of the model test region can have low wind speed fluctuation. The wind tunnel designed by the present invention has a uniformly distributed flow field at the inlet side, and the deviation between the distribution of the speed field and the concentration field in the test region and the actual test results at the sampling points is less than 10%. The inner member arranged in the wind tunnel can adjust the vortex integrating and breaking functions according to the requirements of natural wind, thereby achieving the effect of "quasi-natural" wind more simulatively. The human health risks of the distribution of the atmospheric toluene pollutants in the industrial-zone pollutants in the test region are assessed. FIG. 4 schematically shows the assessment of the population health risks of the atmospheric pollutants in Example 2. From FIG. 4, we can know the pollutant concentration values and human health risk values of the respective grid regions with known area, from which it is inferred that the population exposure risk management should be strengthened in the regions with high health risk values. By setting the pollution source emission characteristics and biological coverage simulation of the terrain model simulation test region, Example 2 significantly improves the applicability of the wind tunnel in the field of ecological environment, is successfully applied to the near-ground atmospheric-boundary-layer atmospheric-pollutant diffusion and control process, and attempts to predict the impact of different atmospheric pollution regions on human health risks, thus having great application and promotion significance.

Example 3

Figure 5:
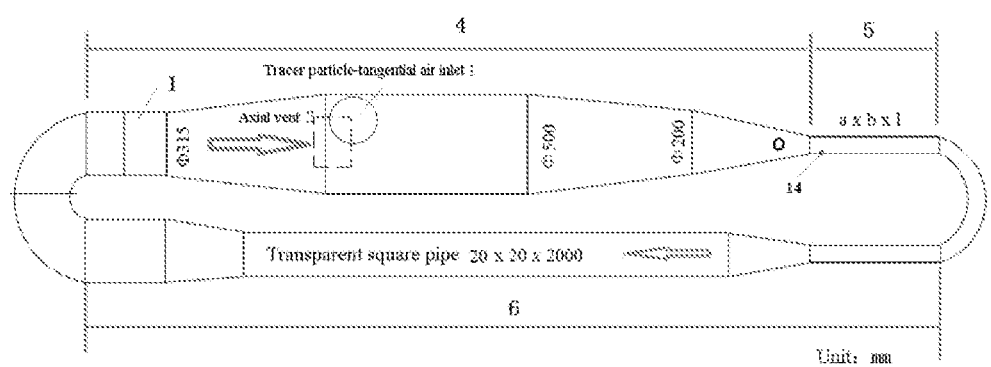
FIG. 5 is a schematic diagram of the wind tunnel in Example 3.

Based on the wind tunnel structure shown in FIG. 5, the data acquisition points are distributed at points s4, s5 and s6 of the sampling hole 15, and the relative humidity during experiment and test is set to 90%; the wind speed is 3.3 m/s, and the wind direction is N; in the terrain model, *Funaria hygrometrica* is arranged in a circular region with a diameter of 0.1 m centered on the data acquisition point s4; a sample inlet, circular in shape with a cross-sectional area of 0.1 $m^2$, is located in the industrial zone of the terrain model in the wind tunnel; the intake speed at the sample inlet is 0.5 m/s, and the inlet sample is a xylene-air mixed gas of 300 μg/$m^3$; an umbrella-shaped inner member 17 is provided in the wind tunnel diffusion homogenizer, and a static mixing spiral rod 18 made of silicon carbide is installed in the swirl mixing pipe; the mass ratio of respirable smoke (having a particle size of 2.5-10 μm) to tracer particle hollow glass beads (having a particle size of 80 μm) is 0.1:9.9, and the proportion is 0.1 g/$m^3$; the wind speed and atmospheric pollutant concentration at the inlet side of the wind tunnel are uniform and stable, and the fluctuation rate of the pollutant-tracer particle concentration of the air entering the test region is below 10%. The survival index and total chlorophyll attenuation rate of *Hypnum plumaeforme* cultivated in the valley area in the terrain model are tested under ultraviolet light irradiation after the wind tunnel runs for 4 h, 8 h, 12 h, 24 h and 48 h; the total chlorophyll attenuation rate and survival rate of bryophytes are 99.3%, 98.6% and 79.59%, 80.0% and 77.1%, 79.3% and 81.6%, 79.59% and 80.0%, and 81.1%, respectively. It can be seen that with the increase of the pollutant photolysis reaction time, the population exposure risk of atmospheric pollution in residential areas in the valley of the wind tunnel first rises, then declines, and then levels off.

By using the computational aerodynamic method to simulate the concentration field in the cyclone distribution pipe 16 of the wind tunnel, it is found that the airflow at the inlet side of the model test region of the wind tunnel can achieve low wind speed fluctuation; in addition, the simulation results of the spatiotemporal variation trend of the concentration field show that the concentration of xylene in the atmosphere of residential areas is also low after 48 hours of emission.

The above-mentioned examples are preferred embodiments of the present invention; however, the embodiments of the present invention are not limited to these examples, and any other alterations, modifications, replacements, combinations and simplifications that are made without departing from the spirit and principle of the present invention shall be equivalent substitutions and within the protection scope of the present invention.

The invention claimed is:

1. A convenient and small near-ground atmospheric-boundary-layer wind tunnel, characterized in that: the near-ground atmospheric-boundary-layer wind tunnel comprises a wind tunnel body and a reflux stabilizer; the wind tunnel body comprises a natural wind injection device and a simulation test device, with the natural wind injection device, the simulation test device and the reflux stabilizer connected in sequence; the natural wind injection device comprises a pipe fan, a swirl mixing pipe, a diffusion homogenizer, and a cyclone distribution pipe connected in sequence; the diffusion homogenizer is provided inside at the center with an inner member for preventing flow separation; and a static mixing spiral rod is welded on the inner wall surface of the swirl mixing pipe.

2. The convenient and small near-ground atmospheric-boundary-layer wind tunnel according to claim 1, characterized in that: the natural wind injection device is provided with a tangential air inlet and an axial vent, and the swirl mixing pipe is provided with an outer pipe and an inner pipe, with the outer pipe connected to the pipe fan through the tangential air inlet; and the axial vent is provided with a static blade, a vortex baffle, and a porous medium filling member.

3. The convenient and small near-ground atmospheric-boundary-layer wind tunnel according to claim 1, characterized in that: the inner member for preventing flow separation is made of temperature-resistant and corrosion-resistant material (silicon carbide, graphene or stainless steel), and has the shape of a ring, a spiral or a fan blade; and the static mixing spiral rod comprises a bundle of porous corrugated plates or a group of spiral rods.

4. The convenient and small near-ground atmospheric-boundary-layer wind tunnel according to claim 1, characterized in that: the reflux stabilizer comprises an elbow pipe, an air induction pipe, a reducer and a reflux pipe that are connected; the elbow pipe comprises a first elbow pipe, a second elbow pipe and a third elbow pipe; the first elbow pipe is connected at both ends to the simulation test device and the air induction pipe, respectively; the air induction pipe is connected to the second elbow pipe, which is connected to the reflux pipe; the reducer is connected at both ends to the reflux pipe and the third elbow pipe, respectively; and the third elbow pipe is connected to the pipe fan.

5. The convenient and small near-ground atmospheric-boundary-layer wind tunnel according to claim 4, characterized in that: the elbow pipe and the reflux pipe have the shape of a square or a ring, and a cross-sectional area of 0.01-1 $m^2$; and the reducer and the reflux pipe have a pipe length of 0.1-10 m.

6. The convenient and small near-ground atmospheric-boundary-layer wind tunnel according to claim 1, characterized in that: the simulation test device is communicated at both sides and/or the upper portion with the atmosphere through an exhaust box, whose wall surface is trumpet-shaped and has a porous structure.

7. The convenient and small near-ground atmospheric-boundary-layer wind tunnel according to claim 6, characterized in that: the simulation test device is provided inside with a terrain model, which is provided with a sampling hole, a sample inlet, or a groove with a culture medium; the sampling hole and the sample inlet have the shape of a circle, an ellipse, a rectangle or a polygon, and a cross-sectional area of 0.001-1 $m^2$.

8. The convenient and small near-ground atmospheric-boundary-layer wind tunnel according to claim 7, characterized in that: the terrain model is provided on the surface with more than one of waterways, biomarkers, and materials with a temperature control function.

9. The convenient and small near-ground atmospheric-boundary-layer wind tunnel according to claim 8, characterized in that: the biomarkers are *Taxiphyllum taxirameum, Sphagnum, Pleurozium schreberi, Barbula subcontorta* Broth, *Funaria hygrometrica, Hypnum plumaeforme* or hoppers; the materials with the temperature control function are one or more of polyurethane, polyethylene, polystyrene, foam glass, magnesium oxide, nanosilica, and aluminum, with a thermal conductivity λ of 0.001-250 W/(m·K).

10. Application of the convenient and small near-ground atmospheric-boundary-layer wind tunnel according to any of claim 1 in assessment of near-ground atmospheric-pollutant diffusion and human exposure risks in a local area, or assessment of impact of a transport and transformation process of environmental pollutants on human health.

* * * * *

UNITED STATES PATENT AND TRADEMARK OFFICE
CERTIFICATE OF CORRECTION

PATENT NO. : 12,117,372 B2
APPLICATION NO. : 17/613294
DATED : October 15, 2024
INVENTOR(S) : Taicheng An et al.

It is certified that error appears in the above-identified patent and that said Letters Patent is hereby corrected as shown below:

In the Claims

Column 8, Lines 44-45, delete "any of" after "tunnel according to".

Signed and Sealed this
Seventeenth Day of December, 2024

Derrick Brent
*Acting Director of the United States Patent and Trademark Office*